3,374,267
PREPARATION OF LOWER ALKANOYLOXY-
PROPIONALDEHYDES
Henry Harry Tan, Wilmington, Del., assignor to E. I. du
Pont de Nemours and Company, Wilmington, Del., a
corporation of Delaware
No Drawing. Filed Aug. 10, 1965, Ser. No. 478,760
3 Claims. (Cl. 260—494)

This invention relates to a novel method for preparing acyloxy-substituted propionaldehydes from sterically hindered aldehydes under mild, acidic conditions. More particularly, it relates to a novel method for the direct preparation of acyloxy-substituted propionaldehydes from sterically hindered dialkyl-substituted acetaldehydes.

Heretofore the preparation of acyloxy-substituted aliphatic aldehydes has been effected by the esterification of the corresponding hydroxy-substituted aldehydic precursors. This is exemplified by the acetylation of hydroxypivalaldehyde (i.e., $\alpha,\alpha$-dimethyl-$\beta$-hydroxypropionaldehyde) with isopropenyl acetate to give acetoxypivalaldehyde, a process described by Hagemeyer and De Croes in "The Chemistry of Isobutyraldehyde and Its Derivatives," Tennessee Eastman Co., Kingsport, Tenn., 1953, page 20. These authors further note that the esterification of hydroxypivalaldehyde with acetic acid or acetic anhydride and an acid catalyst according to the method of Wessely, Monatsh. Chem. 21, 232 (1900), produces the triacetate of hydroxypivalaldehyde which can be hydrolyzed in the presence of dilute mineral acid to acetoxypivalaldehyde and acetic acid.

The hydroxy-substituted aldehydes of the type represented by hydroxypivalaldehyde have been prepared by the base-catalyzed aldol condensation of formaldehyde with an aldehyde bearing a hydrogen atom on its $\alpha$-position carbon atom. However, the reaction conditions of such a process, particularly the temperature, must be rigidly controlled to produce the desired material and to avoid the production of one or more by-products which, indeed, may even be obtained in preference to the desired addition product. Thus, according to the method described in J. Am. Chem. Soc. 66, 21 (1924), isobutyraldehyde is reacted with formaldehyde in the presence of potassium carbonate at a temperature below 25° C. to give an 80% yield of crude $\alpha,\alpha$-dimethyl-$\beta$-hydroxypropionaldehyde (i.e., hydroxypivalaldehyde). The latter aldehyde, as a freshly distilled liquid, B.P. 75–85° C./5 mm., is known to form spontaneously the dimeric 5,5-dimethyl-2-hydroxy-tert.-butyl-m-dioxan-4-ol, M.P. 96° C. Care must be taken in this preparation of hydroxypivalaldehyde since reaction temperatures in excess of 65° C. promote the formation of the glycol ester (i.e., the Tishchenko ester), $$HOCH_2C(CH_3)_2CO_2CH_2C(CH_3)_2CH_2OH$$

This glycol ester may also be formed through the Tishchenko reaction during the distillation of hydroxypivalaldehyde if potassium carbonate is present. The base-catalyzed condensation of formaldehyde with isobutyraldehyde may, in addition, produce 2,2-dimethyl-1,3-propanediol through a Tollens condensation, as shown in Fuson's "Advanced Organic Chemistry," John Wiley & Sons, Inc., New York, N.Y., 1950, page 451. It is thus apparent that the preparation of acyloxy-substituted aldehydes from dialkyl-substituted acetaldehydes through the aforementioned multi-step processes requires carefully controlled reaction conditions in order to get an economical yield of the desired product free from contaminants and by-products.

This invention provides a novel, direct, acid-catalyzed process for preparing acyloxy-substituted propionaldehydes from sterically hindered dialkyl-substituted acetaldehydes. It also provides a high yield synthesis of $\alpha,\alpha$-dialkyl-$\beta$-acyloxypropionaldehydes by the reaction of dialkyl-substituted acetaldehydes, formaldehyde, and a monobasic aliphatic carboxylic acid. Still further, it provides a novel process for the facile preparation of $\alpha$-methyl-$\alpha$-neopentyl-$\beta$-acetoxypropionaldehyde from methylneopentylacetaldehyde. These and other provisions of this invention will become apparent from the specification and claims which follow.

It has now been discovered that aldehydes of the formula (I)
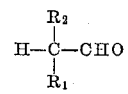

wherein $R_1$ and $R_2$, which may be the same or different, represent alkyl radicals from 1 to about 6 carbon atoms (e.g., methyl, ethyl, n-propyl, butyl, pentyl, neopentyl radicals) may be directly converted under mild acid-catalyzed conditions to the corresponding acyloxymethyl aldehyde of the formula (II)
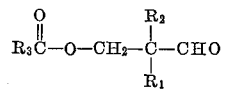

wherein $R_1$ and $R_2$ have the significance set forth hereinbefore and $R_3$ represents an alkyl radical of from 1 to about 6 carbon atoms. The novel synthesis of sterically hindered acyloxymethyl aldehydes of Formula II by this facile 1-step process is accomplished by reacting a solution comprising an aldehyde of Formula I, formaldehyde, and a suitable monobasic carboxylic acid in the presence of a catalytic amount of a mineral acid. The reactants are heated within the range of 50° C. to about 120° C., preferably at about 70° C., for a period of about 6 hours. The reaction mixture is then cooled, diluted with water, and the layers separated. The aqueous layer is extracted with a suitable organic solvent, e.g., ether, and the extracts combined with the organic layer. The combined organic solution is washed, dried, and evaporated; the residual material is then distilled to obtain the desired acyloxymethylaldehyde corresponding to Formula II, which may be designated as an $\alpha,\alpha$-dialkyl-$\beta$-acyloxypropionaldehyde.

Among the dialkyl-substituted acetaldehydes conforming to Formula I which may be employed in the process of this invention may be named isobutyraldehyde, methylethylacetaldehyde, methyl-n-propylacetaldehyde, diethylacetaldehyde, methylisopropyl acetaldehyde, methylneopentylacetaldehyde, and the like. Carboxylic acids which are useful in this invention include acetic, propionic, butyric, and caproic; the preferred carboxylic acid is glacial acetic acid. The $\alpha,\alpha$-dialkyl-$\beta$-acyloxypropionaldehydes produced by this invention constitute useful intermediates which may be readily converted to the corresponding carboxylic acids, hydroxycarboxylic acids, and the like. For example, acetoxypivalaldehyde may be converted by the process of U.S. 2,820,055 to acetoxypivalic acid which is disclosed in U.S. 2,658,055 as useful for the manufacture of high melting linear polyesters.

The condensation reaction of this invention advantageously requires only equivalent quantities of the dialkyl-substituted acetaldehyde and formaldehyde, and is not subject to the process limitations necessary to avoid the numerous side reactions and by-products which may be observed in the base-catalyzed condensations with formaldehyde. Acylation of the initially formed methylol derivative proceeds smoothly to give a good yield of the acyloxyaldehyde of Formula II.

It is known that an unhindered aliphatic aldehyde bearing two hydrogen atoms on the $\alpha$-position carbon atoms may undergo an acid-catalyzed aldol condensation with formaldehyde. An example of this is reported by Olsen in Acta Chem. Scand. 7, 1364–9 (1963) wherein acetaldehyde was subjected to a sulfuric acid-catalyzed Tollens reaction with excess formaldehyde in the presence of glacial acetic acid at an elevated temperature. However, under the conditions employed, the products obtained from this reaction were the acetate formal of pentaglycerol (48% yield) and pentaglycerol triacetate (2.4% yield).

The present invention is illustrated by the following non-limiting examples.

*Example I*

This example illustrates the preparation of α-methyl-α-neopentyl-β-acetoxypropionaldehyde by the process of this invention.

Into a 1 l., 3-necked round-bottom flask equipped with a stirrer, reflux condenser, and thermometer are placed 96 g. (0.76 mole) of methylneopentylacetaldehyde and 470 ml. of glacial acetic acid. To this stirred solution is added 22.8 g. of paraformaldehyde (equivalent to 0.76 mole of formaldehyde), followed by 65 drops of concentrated sulfuric acid. The reaction mixture is heated to 70° C. and is stirred at this temperature for 6 hours. It is then cooled, diluted with 500 ml. of water, and the layers separated. The water layer is extracted with ether several times, and the extracts combined with the previously-separated organic layer. The combined organic solutions are washed once with 100 ml. of a saturated solution of sodium chloride, then dried over anhydrous sodium sulfate. After the drying agent and the solvent are removed, the residue is distilled to give 74.7 g. (49.1% yield) of α-methyl - α - neopentyl - β - acetoxypropionaldehyde, B.P. 66°–67° C./0.15 mm., whose structure is confirmed by infrared and nuclear magnetic resonance spectra.

*Example II*

This example demonstrates the synthesis of α-methyl-α-neopentyl-β-acetoxypropionaldehyde by a 2-step process using a base-catalyzed aldol condensation of formaldehyde with methylneopentylacetaldehyde. The yield, based on the formaldehyde charged, is only 61% of that in the previous example.

Into a 2 l., three-necked round-bottom flask are mixed 292 g. (2.28 moles) of methylneopentylacetaldehyde, 225 g. (7.0 moles) of methanol, and 157 g. (1.93 moles) of 37% aqueous formaldehyde solution. While the mixture is stirred at 13–15° C., a solution of 10% sodium methoxide in methanol is added slowly, maintaining the pH of the mixture at 10.5–10.8 for three hours at 15° C. To the mixture is then added 10% sulfuric acid solution until the pH reaches 6.7. The solid precipitate is filtered and the filtrate concentrated and taken up in 600 ml. of benzene. To the benzene solution is added 260 g. of acetic acid and 5.0 g. of p-toluenesulfonic acid. The mixture is stirred under reflux while water continuously separates out in a "Dean-Stark" trap. After 3.5 hours, the solution is concentrated and fractionally distilled to give 112 g. (30% yield) of α-methyl-α-neopentyl-β-acetoxypropionaldehyde, B.P. 70–71°/0.08 mm.; $n_D^{25}$ 1.4380.

*Example III*

This example demonstrates the preparation of α,α-diethyl-β-acetoxypropionaldehyde by the process of this invention.

Into a 1 l., 3-necked round-bottom flask, equipped as described in Example I, are placed 76 g. (0.76 mole) of diethylacetaldehyde, 470 ml. of glacial acetic acid, 22.8 g. (0.76 mole) of anhydrous linear polyoxymethylene and 65 drops of concentrated sulfuric acid. The reaction mixture is heated to 70° C. and maintained at this temperature for 6 hours. The mixture is then cooled, diluted with 500 ml. of water, and the resulting emulsion extracted with ether (3× 300 ml.). The ether extracts are combined, washed with saturated brine, and dried over anhydrous magnesium sulfate. After the drying agent and the solvent are removed, the residue is distilled to give 71.5 g. (54.6% yield) of α,α - diethyl - β - acetoxypropionaldehyde, B.P. 45° C./0.06 mm., $n_D^{26}$ 1.4320. The infrared spectrum of the product includes the following absorption bands which further identify the product: 3.67μ (aldehydic C—H), 5.7μ (C=O), and 8.07μ (acetate).

The above examples are illustrative of the instant simple process for preparing α,α-dialkyl-β-acyloxypropionaldehydes by the reaction of (1) dialkyl-substituted acetaldehydes, (2) formaldehyde, which may be provided by any of several sources as shown, and (3) a monobasic aliphatic carboxylic acid in a strong acid catalyzed system. The carboxylic acid reactant also serves as a solvent and the use of too small a quantity may require that another solvent be used. A 5 to 10 molar excess of the carboxylic acid should preferably be used in order to provide both a reactant and an amount of solvent sufficient for adequate mixture fluidity. The acid catalyst requirements for the process are not critical. Industrially, based on availability and corrosivity, sulfuric acid, sulfonic acids (including polymeric ones), phosphoric acid, or polyphosphoric acid are preferred. Hydrochloric and hydrobromic acids are less desirable since they are corrosive, less dehydrating as usually supplied, and weaker. Satisfactory yields are obtained at 100/1 to 10/1 ratios of alkyl-substituted aldehyde/catalyst on a mole basis.

Further embodiments of the above invention will be apparent to those in the art.

What is claimed is:

1. A method for preparing lower alkanoyloxy-substituted propionaldehydes comprising reacting an aldehyde of the formula

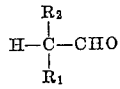

wherein $R_1$ and $R_2$, which may be the same, represent alkyl radicals of from 1 to about 6 carbon atoms, with a formaldehyde-yielding compound and a monobasic carboxylic acid, in the presence of a catalytic amount of a mineral acid at a temperature within the range of from about 50° to about 120° C.

2. A method for preparing α-methyl-α-neopentyl-β-acetoxypropionaldehyde comprising reacting methylneopentylacetaldehyde with formaldehyde and acetic acid in the presence of a catalytic amount of sulfuric acid and at a temperature in the range of from about 50° to about 120° C.

3. A method for preparing α,α-diethyl-β-acetoxypropionaldehyde comprising reacting diethylacetaldehyde with acetic acid and formaldehyde in the presence of a catalytic amount of sulfuric acid and at a temperture in the range of from about 50° to about 120° C.

References Cited

UNITED STATES PATENTS 2,811,562  10/1957  Hagemeyer _____ 260—638

OTHER REFERENCES

Royals: Adv. Org. Chem., 1954, p. 758.

LORRAINE A. WEINBERGER, *Primary Examiner.*

V. GARNER, *Assistant Examiner.*